Nov. 8, 1927.
S. W. SPARKS
GATE VALVE
Filed Nov. 20, 1925
1,648,071
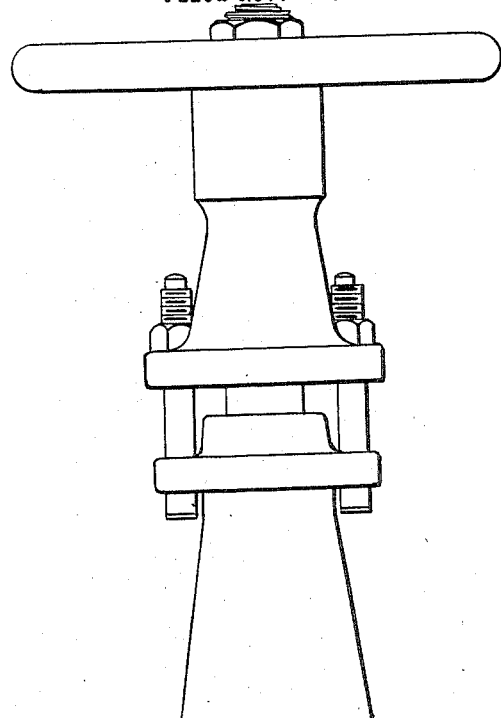
FIG. I.
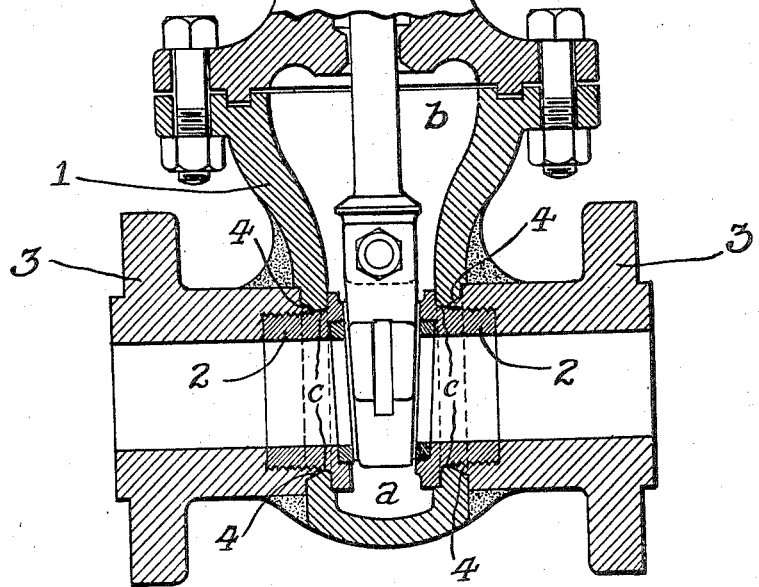
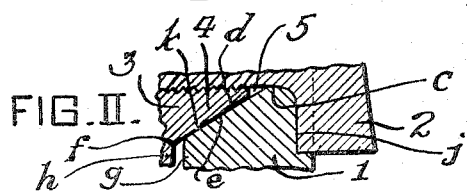
FIG. II.
INVENTOR:
Stanley W. Sparks,
BY
*[signature]*
HIS ATTORNEY.

Patented Nov. 8, 1927.

1,648,071

UNITED STATES PATENT OFFICE.

STANLEY W. SPARKS, OF SUMMIT, NEW JERSEY, ASSIGNOR TO THE COLUMBUS MACHINE COMPANY, OF COLUMBUS, OHIO, A CORPORATION OF OHIO.

GATE VALVE.

Application filed November 20, 1925. Serial No. 70,210.

This invention relates to improvements in gate valves and has for its principal objects the production of a valve of this type which is extremely resistant to distortion or leakage due to high pressures and high temperatures and is economical to manufacture, as well as attractive in appearance.

My invention is fully set forth in detail in the following description and drawings forming a part thereof in which Figure 1 is an elevation partially in section of a gate valve embodying my invention; and Fig. 2 is an enlarged detail section of the inner end of a hub member with its contacting parts of the valve body.

Referring to the drawing and construction shown therein, reference numeral 1 designates the casing of the valve body proper, the same being preferably of such configuration as to afford a lower chamber $a$ of substantially oblong cross section and an upper chamber $b$ which is of substantially circular cross section adjacent the upper end thereof. The walls of the lower portion of said casing are pierced to form opposing apertures $c$ which are adapted to receive removable internal bushing members 2 and the latter are threaded at their outer ends to receive hollow hub members 3 that are adapted to be threaded thereover. Each of said hollow hub members is provided with an integral terminal annulus of substantially wedge-shaped configuration 4, and the outer face $d$ thereof is of slightly different angularity than the co-operating inclined face $e$ of the marginal recess 5 formed in the casing 1, which receives said wedge-shaped extension or terminus of each hub member. As shown, the said extensions 4 are threaded to permit of same being applied to the threaded outer ends of the said internal bushing members 2.

As shown in Fig. 2, the diameter of the annulus at the point $f$ is slightly greater than the maximum diameter of the bevelled recess 5, so that when the said hub is screwed into the final position shown in Fig. 1, considerable pressure is exerted upon said annulus and the same results in a slight cold flow of the metal of the annulus thus causing it to substantially fill the recess and admitting of the wall $g$ intimately engaging the wall $h$ of the hub while simultaneously drawing the flanges of internal bushing into pressure-tight engagement with the machined wall section $j$ of casing 1.

This integral annulus also allows of the use of a soft high temperature resisting metal gasket to be used between the annulus of the hub and the wall of the recess 5 as indicated by the numeral $k$. It is preferable to construct the hubs of heat treated steel of greater ductility than casing 1, preferably a carbon steel of .25 to .30 per cent carbon would be suitable, whereas the casing or body should preferably be of a .35 to .40 per cent carbon steel.

Having thus described my invention, what I claim and desire to obtain by Letters Patent of the United States is:

1. In a valve assembly, the combination comprising a valve body having opposing lateral apertures respectively adapted to receive internal bushings, the marginal walls of said body adjacent said apertures being provided with recesses of enlarged diameter with respect to that of the said apertures, internal bushing members fitted in said apertures and hub members having tapered inner ends fitted on the outer ends of said bushings.

2. In a valve assembly, the combination comprising a valve body having opposing lateral apertures respectively adapted to receive internal bushings, the marginal walls of said body adjacent said apertures being provided with recesses of enlarged diameter with respect to that of the said apertures, internal bushing members fitted in said apertures and hub members having tapered inner ends normally of a slightly different angularity from that of the walls of said recesses.

3. In a valve assembly, the combination comprising a valve body having opposing lateral apertures respectively adapted to receive internal bushings, the marginal walls of said body adjacent said apertures being provided with tapered recesses of enlarged diameter with respect to that of the said apertures, internal bushing members fitted in said apertures and hub members having tapered inner ends fitted on the outer ends of said bushings.

4. In a valve assembly, the combination comprising a valve body having opposing lateral apertures respectively adapted to receive internal bushings, the marginal walls of said body adjacent said apertures being provided with tapered recesses of enlarged diameter with respect to that of the said apertures, internal bushing members fitted in said apertures and hub members having tapered inner ends fitted on the outer ends of said bushings, said tapered portions of the hub members being of highly ductile steel of from .25 to .30 per cent carbon content and the adjacent walls of the body of a less ductile steel of from .35 to .40 per cent carbon content.

Signed at New York, in the county and State of New York this 6th day of Nov., 1925.

STANLEY W. SPARKS.